United States Patent [19]
Tanigaki

[11] Patent Number: 5,422,683
[45] Date of Patent: Jun. 6, 1995

[54] IMAGE DISPLAY AND PICK-UP APPARATUS

[75] Inventor: Yasushi Tanigaki, Tokyo, Japan

[73] Assignee: U.S. Philips Corporation, New York, N.Y.

[21] Appl. No.: 146,291

[22] Filed: Oct. 28, 1993

[30] Foreign Application Priority Data

Nov. 4, 1992 [JP] Japan .................... 4-319354

[51] Int. Cl.⁶ ............................ H04N 7/14
[52] U.S. Cl. .................... 348/744; 348/14; 348/15; 348/456; 348/756; 348/781; 348/335; 359/625
[58] Field of Search ........... 348/744, 756, 840, 832, 348/781, 756, 14, 93, 54, 131, 335, 341, 344, 15, 776; 359/837, 210, 453, 454, 456, 457, 599, 618, 619, 625

[56] References Cited
U.S. PATENT DOCUMENTS

| | | | |
|---|---|---|---|
| 2,590,049 | 5/1952 | Siezen | 359/457 |
| 4,475,791 | 10/1984 | Nixon | 359/454 |
| 4,729,631 | 4/1988 | Takahashi et al. | 359/457 |
| 5,282,027 | 1/1994 | Takahashi et al. | 348/14 |

FOREIGN PATENT DOCUMENTS

0454244 10/1991 European Pat. Off. .
0503432 9/1992 European Pat. Off. ....... H04N 7/14

OTHER PUBLICATIONS

Search Report.

*Primary Examiner*—James J. Groody
*Assistant Examiner*—Nina N. West
*Attorney, Agent, or Firm*—David R. Treacy

[57] ABSTRACT

An image pick-up and projection apparatus comprising a projection unit (14), a pick-up unit (11) and a projection screen (9) switchable between a transmissive state and a diffusing state. By arranging an array (15) of elongated prismatic elements on the front surface of the screen, the contrast of the projected image is enhanced and it is avoided that a user (12) can simultaneously see the front of the projection unit and the front of the pick-up unit.

3 Claims, 6 Drawing Sheets

IMAGE DISPLAY AND PICK-UP APPARATUS

BACKGROUND OF THE INVENTION

The invention relates to an image display and pick-up apparatus comprising:
a screen switchable between a transmissive state and a diffusing state and having a front side and a rear side;
a projection unit arranged at the rear side of the screen for projecting an image on the screen, which image is viewed from the front side;
a pick-up unit arranged at the rear side of the screen and facing the rear side at a predetermined angle for picking up, through the screen an image of an object located at the front side of the screen.

Such apparatus is known from, for example, EP-A 0 454 244 to which U.S. Pat. No. 5,282,027 corresponds, and is shown schematically in FIG. 2a. In the videophone monitor of FIG. 2a, at the rear side of a screen 9 of a videophone monitor 1, a projecting unit 8 consisting of a lamp 2, a reflector 3, a condenser lens 4, a shutter 5, a liquid crystal device (LCD) 6 which is a display device of a transmission type and a projection lens 7 are arranged on an optical axis 10. At the rear side of the screen 9, there is a/so arranged a pick-up unit 11 consisting of a CCD camera or the like. The pick-up unit 11 is not located on the optical axis 10, but in the vicinity of the projection lens 7 such that the field of view of the projection lens 7 and that of the pick-up unit 11 are substantially the same.

Light emitted from the lamp 2 is reflected by the reflector 3 and converted into a parallel light beam by the condenser lens 4. When an image is to be displayed, the shutter 5 is in the transmission state, so that the light beam passes through it and is incident on the LCD screen. The fight beam is then modulated with the information of the image on the LCD device and the modulated beam passes through the projection lens 7 to the projection screen 9. The lens projects an image of the LCD display on the screen.

As described in EP-A 0 454 244 the projection screen is switchable between two states. FIG. 2b shows an embodiment of such screen. The screen may comprise a plate of transparent material wherein small particles 13, for example spheres, are embedded. These spheres consist of a material, the refractive index of which can be switched between a first value different from that of the plate material and a second value equal to that of the plate material. If the refractive index of the particles 13 is different from that of the plate material, these particles act as diffusing particles and the projection screen is then in the diffusing state. This is represented in FIG. 2b by the shaded spheres. If the refractive index of the particles 13 is equal to that of the plate material, represented in FIG. 2b by the open spheres, the projection screen is in a fully transmissive state.

The shutter 5 and the projection screens are controlled synchronously. If an image is to be displayed towards the user 12, the shutter is set in the transmissive state and the screen in the diffusing state. If an image of the user 12 is to be taken, the shutter is closed and the screen is set in the transmissive state. The particles 13 may consist of a liquid crystal material. It is also possible that the screen 9 comprises an EC material or an electro-conductive polymer.

FIG. 3 illustrates what the user, looking at the videophone monitor, sees during the pick-up state, i.e. when the shutter 5 is closed. As in this state the projector 8 emits no light, the brightness of the screen is low and the user 12 can look through the screen and can see the structure at the rear side of the screen. The user can see then a lens surface 11a of the pick-up unit 11 and a lens surface 7a of the projection lens 7.

During use of the videophone monitor the projection screen 9 is periodically switched between the diffusing state and the transmissive state. As during the pick-up state the user can see the projection lens surface 7a, he may see a delayed projected image and mix this up with the projected image of the subsequent state, i.e. a projection state.

Moreover, when the screen 9 is set in the diffusing state, an ambient fight incident on front surface side of the screen 9 is diffusely reflected by the particles 13 towards the user 12. So that the contrast of the projected image decreases.

SUMMARY OF THE INVENTION

The object of the present invention is to provide an image display and pick-up apparatus which does not show the above disadvantages, which provides a projected image with high contrast and in which during the pick-up stage the user can only see the front of the pick-up unit.

To that end the apparatus according to the invention is characterized by an array of elongated prismatic elements having their length direction perpendicular to a plane containing the optical axes of the projection unit and of the pick-up unit and arranged at the front surface of the screen, each element having a facet at an acute angle with the front surface, said array deflecting light from the object towards the pick-up unit.

During the pick-up stage the array of the prismatic elements passes light from the projection unit undetected to a space outside the field of view of the user.

The invention will now be explained with reference to the drawings:

DESCRIPTION OF THE PREFERRED EMBODIMENT

Figure 1:
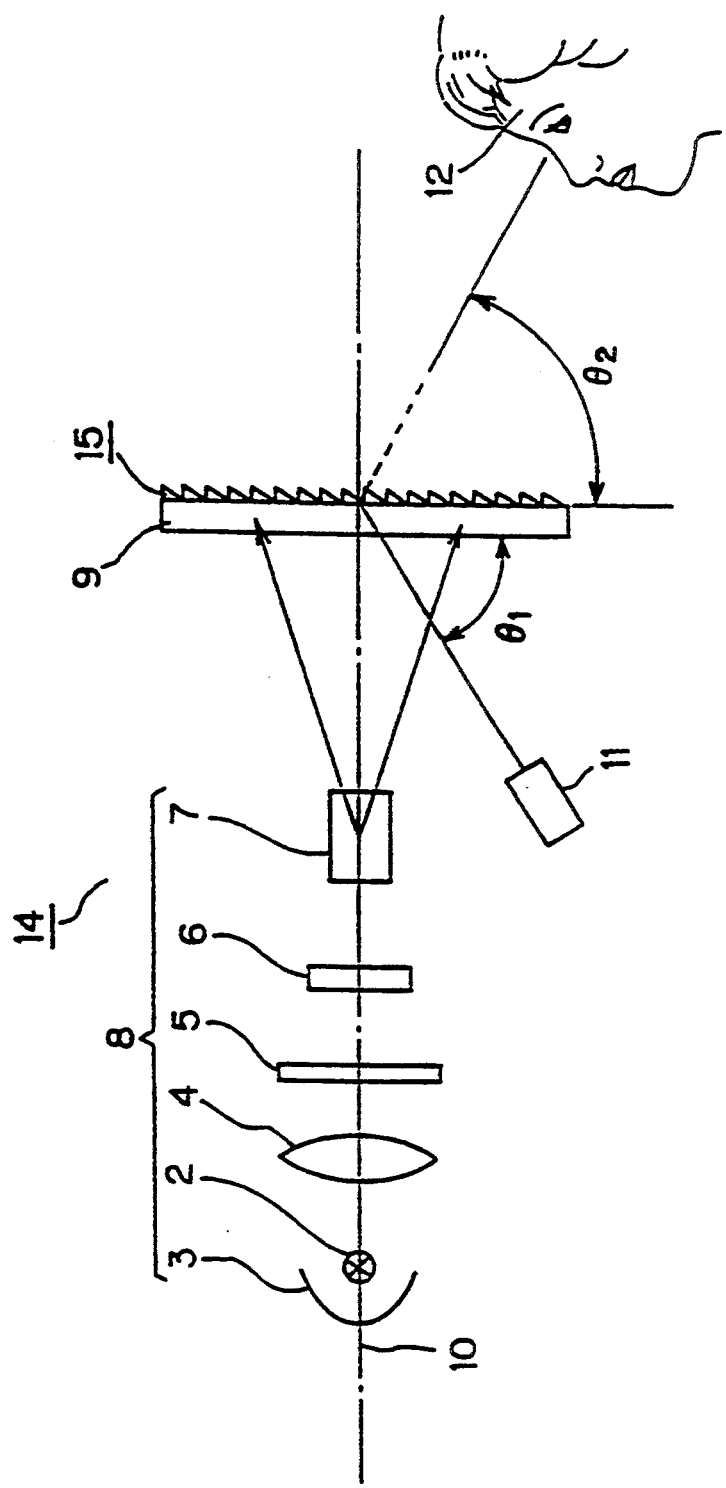
FIG. 1 shows schematically an embodiment of the videophone monitor according to the present invention, FIGS. 2a and 2b schematically represent a conventional videophone monitor.
Figure 2A:
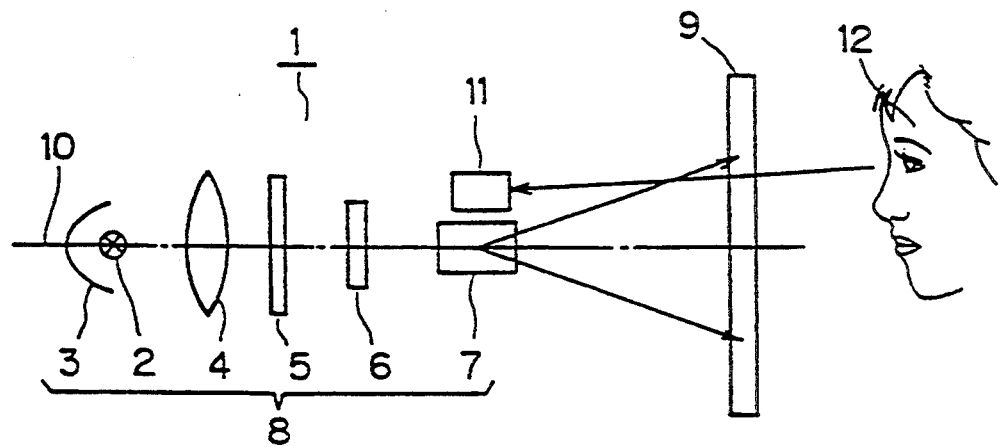
Figure 2B:
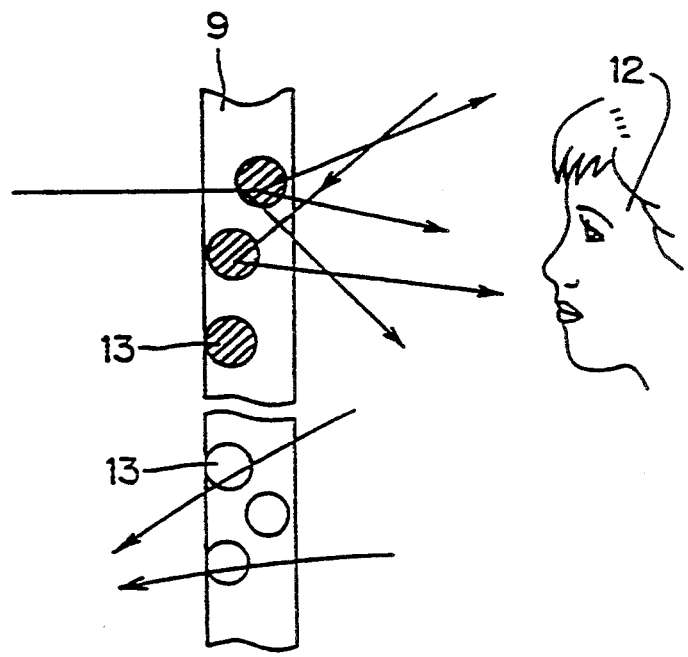
Figure 3:
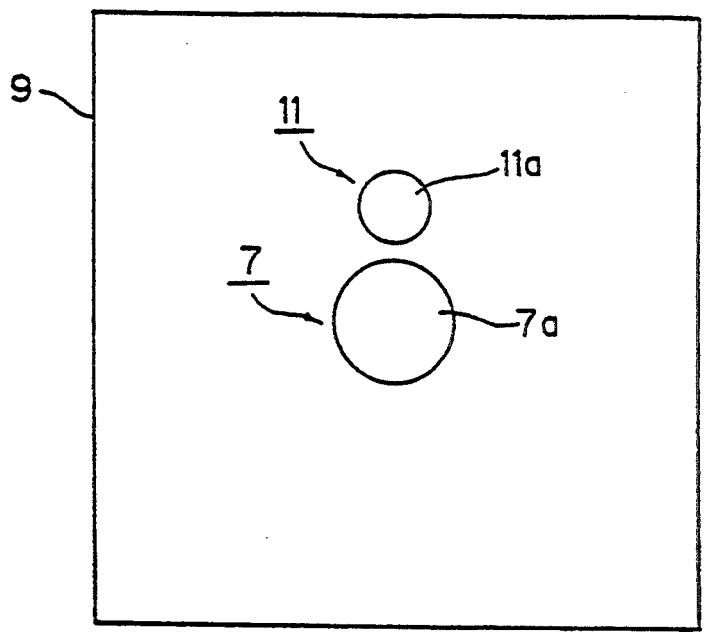
FIG. 3 illustrates the user's field of view during the pick-up stage in the conventional videophone monitor.
Figures 4A, 4B:
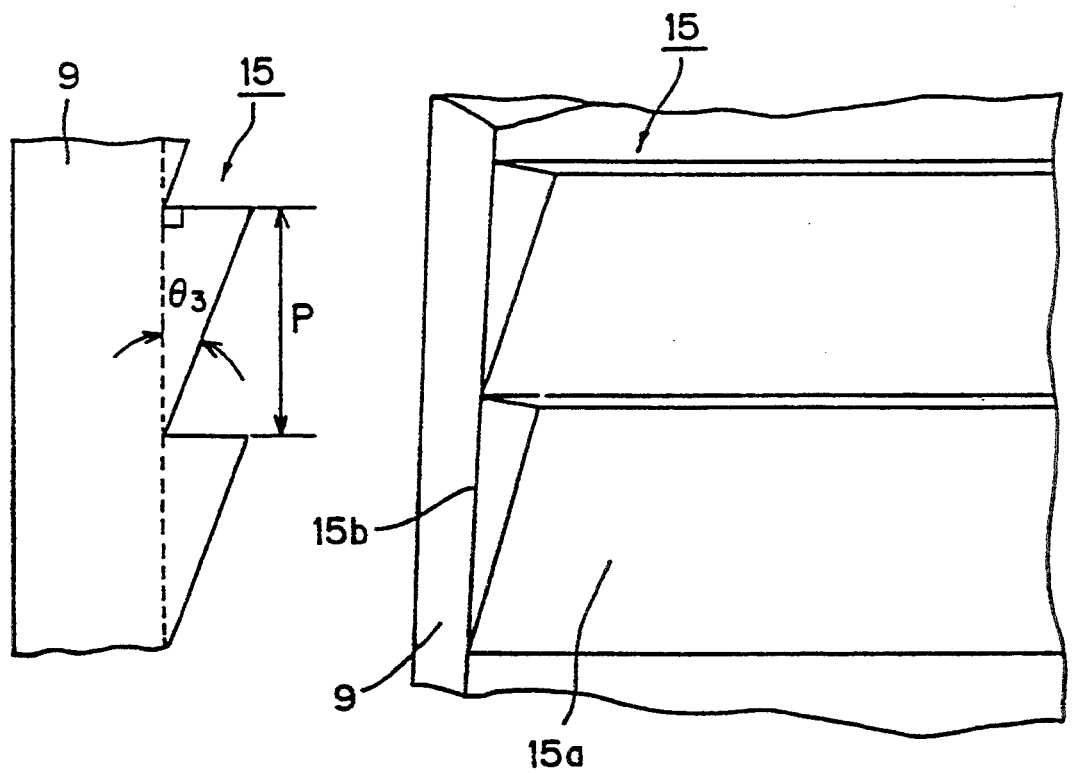
FIGS. 4a and 4b show on an enlarged scale a part of the array of prismatic elements.

In the videophone monitor 14, shown in FIG. 1, a projection unit 8, which consists of a lamp 2, a reflector 3, a condenser lens 4, a shutter 5, a display device, for example a liquid crystal device (LCD) 6 of a transmission type and a projection lens 7 and a screen 9 are provided on an optical axis, similarly to the videophone monitor 1 explained in FIG. 2. A pick-up unit 11 is arranged at the rear side of the screen, such that its optical axis forms an angle $\Theta_1$ with the rear surface of the screen 9. The field of view of the pick-up unit 11 and the field of view of the projection lens 7 are substantially the same due to a prismatic array 15 arranged on the front surface of the screen 9. The array 15 has such a construction that light from a user that is incident on the screen 9 at an angle $\Theta_2$, in other words, light that is incident on the facets of the prisms of array 15 substantially at a right angle is deflected toward the pick-up unit 11. FIG. 4a shows on an enlarged scale a part of the array of prisms 15 in a transverse cross-section and FIG. 4b show this part of the array in an oblique view.

The array 15 comprises a plurality of elongated prismatic elements each having a triangular cross-section shape and having a skew facet 15a, a base 15b and an edge which is, for example, perpendicular to the front surface of the screen 9. The elevation angle between the facet 15a and the base 15b is, for example, 20° to 50° and the pitch of the array is, for example, 0.3 mm to 3 min.

Figure 5:
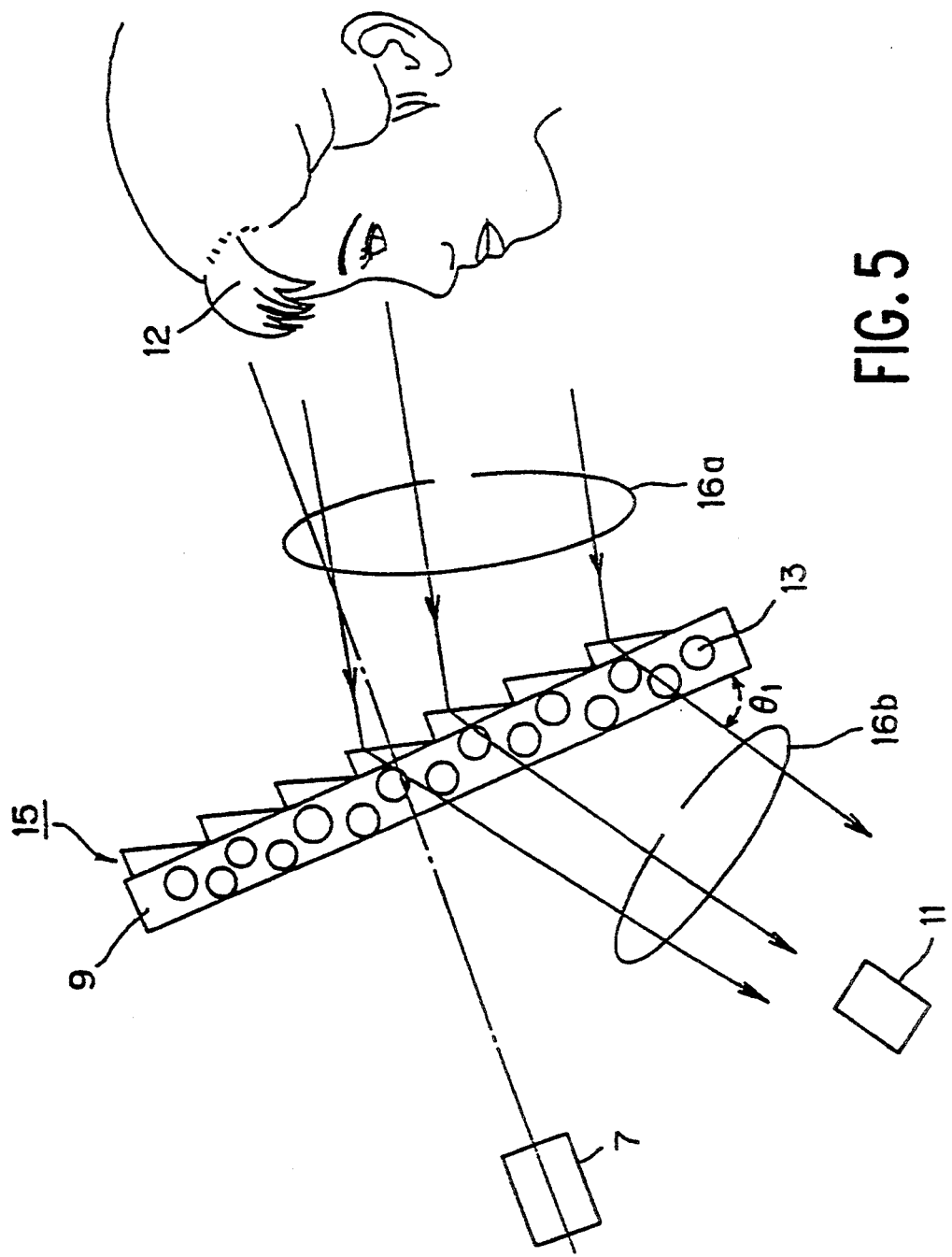
FIG. 5 shows the array paths in the videophone monitor according to the invention during the pick-up stage.

FIG. 5 shows the ray paths in the apparatus according to the invention when the screen 9 is set in the transmissive state, i.e. when a picture of the user 12 is to be taken by the pick-up unit 11.

As shown in FIG. 5, light 16a from the user 12 is deflected by the prismatic array 15 and directed as light 16b towards the pick-up unit 11. The direction of the light 16b forms an angle $\Theta_1$ with the rear surface of the screen. On the other hand light from the projection lens 7, which light represents a projected image, is passed through the screen towards a space outside the field of view of the user. This light is not incident at an angle $\Theta_1$ on the projection screen and therefore not deflected towards the user.

Figure 6:
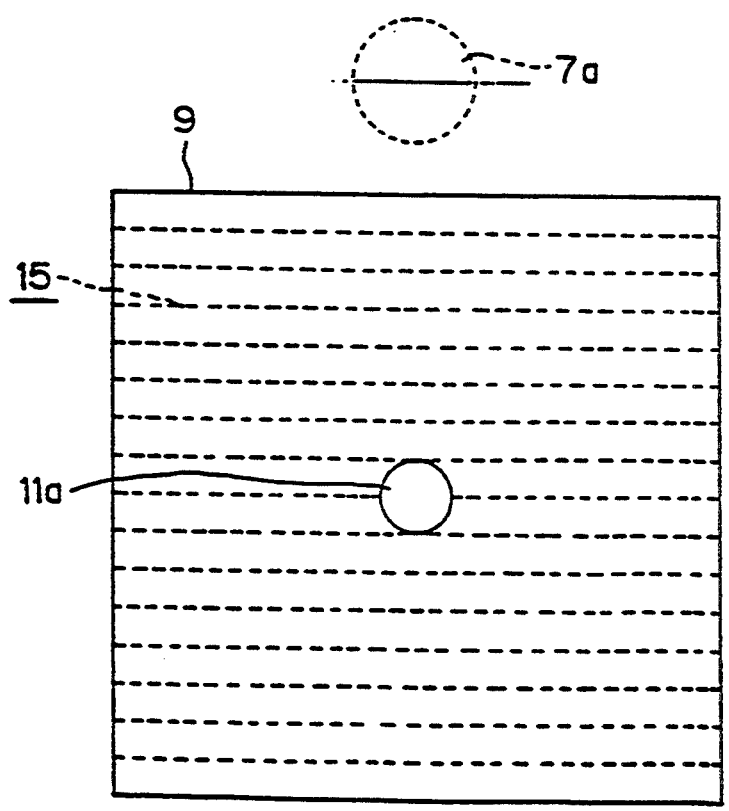
FIG. 6 illustrates the user's field of view during the pick-up stage in the videophone monitor of the present invention.

FIG. 6 illustrates what the user 12 looking at the apparatus of the present invention sees during the image pick-up stage. In the area of the projection screen 9 this user sees only the front surface 11a of the pick-up unit, the optical axis of which forms an angle $\Theta_1$ with the rear surface of the projection screen. The, imaginary, front surface 7a of the projection lens 7 is located outside the projection screen area and cannot be seen by the user.

Figure 7:
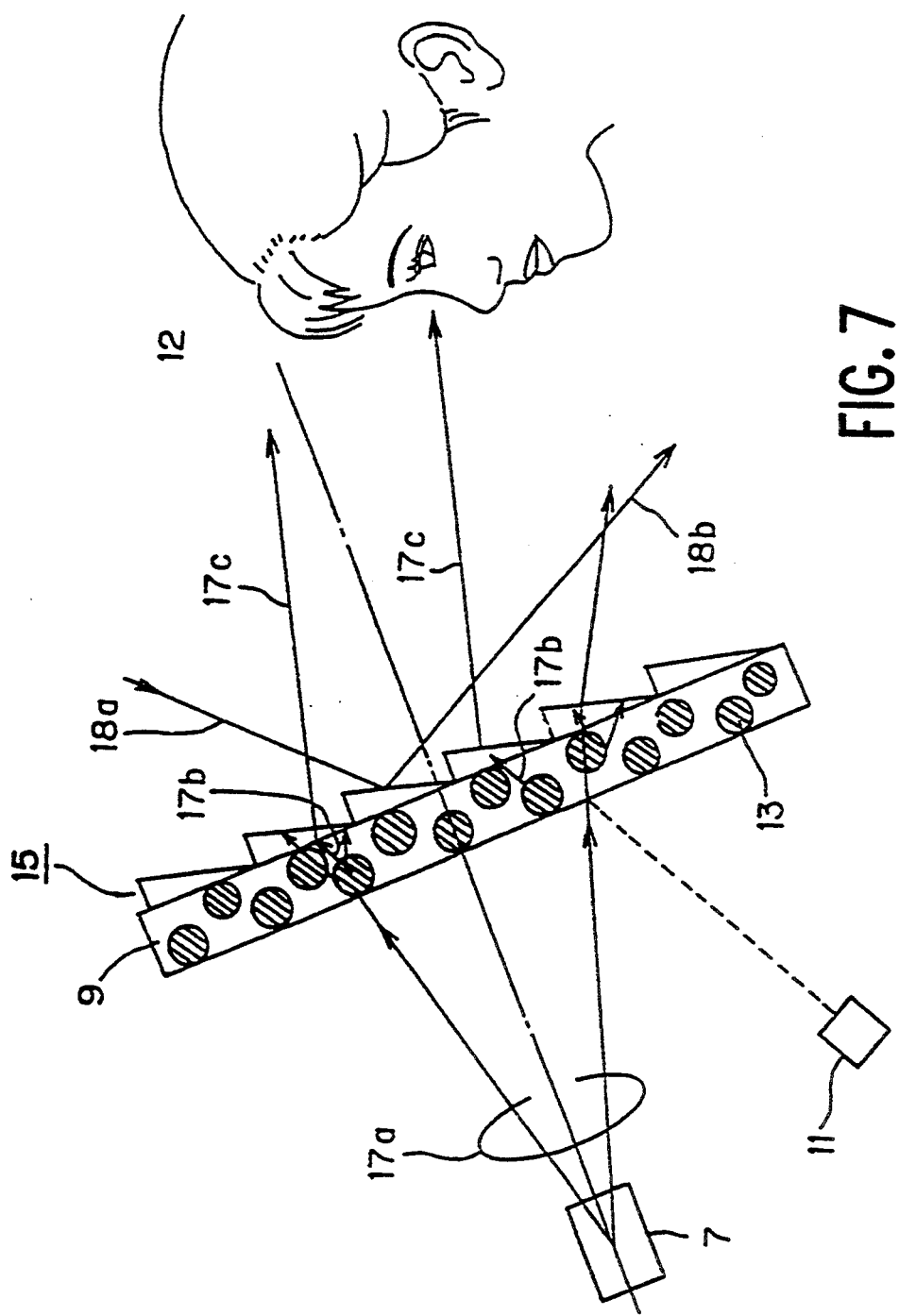
FIG. 7 shows the ray paths in this videophone monitor during the projection stage.

FIG. 7 shows the ray paths in the apparatus according to the invention when the screen 9 is set in the diffusing state, i.e. when an image of the LCD device is projected onto the screen 9. The light beam 17a from the projection lens 7 enters the screen 9 and is therein transmitted diffusely due to the particles 13 having a refractive index different from that of the screen plate material. Of the diffused light the part 17b, which propagates in a direction at an angle $\Theta_1$ with the screen surface, is deflected by the prismatic array 15 as light 17c towards the user, which can see a projected image. On the other hand, ambient light 18a, incident on the array of prismatic elements 15, is reflected by this army as light 18b into a space outside the field of view of the user 12. Such ambient light cannot decrease the contrast of the projected image.

The invention is not limited to the above embodiment. The apparatus of the present invention may, instead of a videophone, also be an interphone or the like for checking a visitor. Furthermore, the projection screen may, instead of a liquid crystal, comprise, for example, an EC material, an electro-conductive polymer or the like.

In the image display/pick-up apparatus according to the invention, ambient light incident on the front surface of the screen 9 is reflected by the prismatic array and does not enter the screen and cannot be diffusely reflected by the screen particles 13 towards the user.

Furthermore, by arranging the pick-up unit at a considerable distance from the projection lens, the user cannot see the pick-up unit and the projection lens at the same time. The prismatic array provides an optical connection between the projection lens and the user during the image projection stage and an optical connection between the pick-up unit and the user during the pick-up stage.

I claim:

1. An image display and pick-up apparatus comprising:
    a screen which is switchable between a transmissive state and a diffusing state, and has a front side and a rear side,
    a projection unit, having an optical axis, and arranged at the rear side of the screen for projecting an image onto the rear side of the screen, the image thereby being viewable from the front side of the screen when the screen is in the diffusing state, and
    a pick-up unit, having an optical axis, and arranged at and facing the rear side of the screen at a predetermined angle for picking up, through the screen, an image of an object located at the front side of the screen,
    characterized in that the optical axes of the projection unit and pick-up unit are co-planar and intersect at a given acute angle, said predetermined angle being a first acute angle from the rear surface of the screen, and
    the screen comprises an array of elongated prismatic elements arranged at the front surface of the screen, having their length direction perpendicular to a plane containing the optical axes of the projection unit and the pick-up unit, each element having a facet arranged at an acute elevation angle with respect to the front surface of the screen for deflecting light from the object, incident on the front surface at a second acute angle, towards the pick-up unit.

2. An image display and pick-up apparatus as claimed in claim 1, characterized in that said predetermined angle is inversely proportional to said acute facet angle.

3. An image display and pick-up apparatus as claimed in claim 1, characterized in that said pick-up unit and projection unit are disposed at distances from the screen such that a user cannot see both the pick-up unit and projection unit at the same time.

* * * * *